Oct. 2, 1951  G. W. HOOVER ET AL  2,569,473
FLIGHT INSTRUMENT FOR AIRCRAFT
Filed June 30, 1945  2 Sheets-Sheet 1

INVENTORS
GEORGE W. HOOVER
ERVING E. EASTON
BY
Ralph L Chappell
ATTORNEY

Oct. 2, 1951  G. W. HOOVER ET AL  2,569,473
FLIGHT INSTRUMENT FOR AIRCRAFT
Filed June 30, 1945  2 Sheets-Sheet 2

INVENTORS
GEORGE W. HOOVER
ERVING E. EASTON
BY
ATTORNEY

Patented Oct. 2, 1951

2,569,473

UNITED STATES PATENT OFFICE 2,569,473

FLIGHT INSTRUMENT FOR AIRCRAFT

George W. Hoover and Erving E. Easton, United States Navy

Application June 30, 1945, Serial No. 602,626

6 Claims. (Cl. 33—204)

(Granted under the act of March 3, 1883, as amended April 30, 1928; 370 O. G. 757)

This invention relates to aircraft flight instruments of the type which indicate the attitude of the aircraft with respect to the horizontal plane and which may also be combined with a directional instrument to simultaneously indicate the heading, this application being a continuation-in-part of our application Serial No. 556,244 filed September 28, 1944, and entitled "Combined Attitude and Directional Instrument for Aircraft," which became Patent No. 2,487,809, issued November 15, 1949.

The patent application referred to above discloses several species, of which there are two wherein the attitude-indicating elements are rotatable freely through 360 degrees in any direction. We have provided improvements in these two species whereby an indication of the attitude of the aircraft is provided even though the aircraft be in inverted flight as the result of a half-loop or the like.

Another improvement is that an indication of the attitude is also provided if the aircraft should go through a half-loop and then to normal flight by means of a half roll, or vice versa, whereas in the disclosure of the related species in the aforesaid patent application the silhouette of the attitude instrument would be out of sight after these same maneuvers.

Accordingly, it is the primary object of this invention to provide an improved aircraft-attitude flight instrument, which is gyroscopically actuated, has full 360 degrees of freedom of movement about any axis without tumbling, and which will provide a correct visual indication of the attitude of the aircraft within a range of attitudes having a wide variance from the normal attitude.

Another object is the provision of an improved combined attitude and directional flight instrument.

Other objects will become apparent as the description proceeds in connection with the appended claims and the annexed drawings, wherein Fig. 1 is a top plan view of one embodiment, with the top removed and some parts in section to show the interior arrangements;

The above described figures are substantially identical with Figures 11, 12, 13 and 14 of our above-identified patent application, except that they show the added improvements which we have incorporated into the devices.

Figure 1:
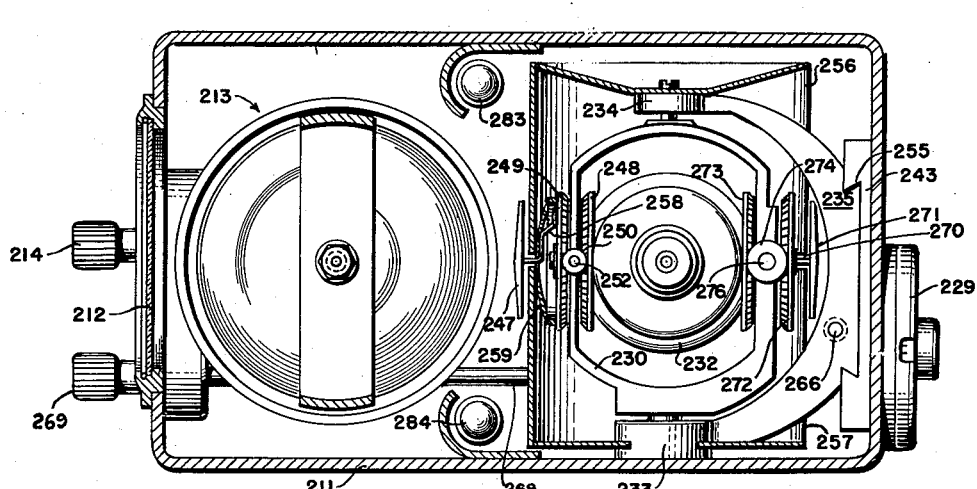
Figure 2:
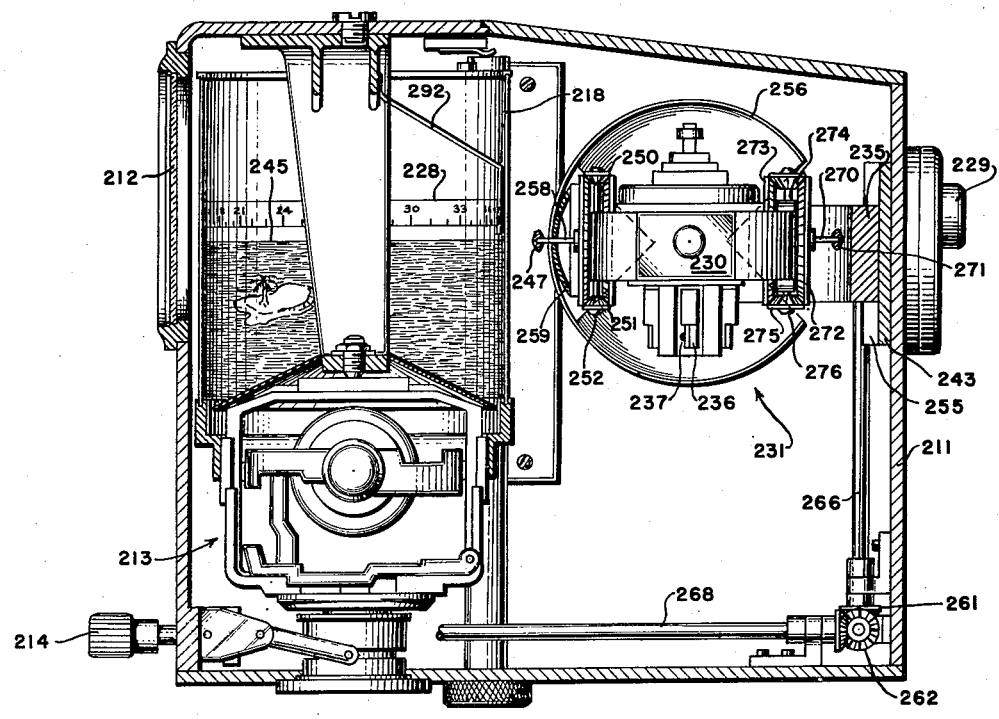
Fig. 2 is a side elevation, partly in section, of the same embodiment as in Fig. 1.

As shown in Figs. 1 and 2, the airtight housing 211 has a front window 212 which is polarized with an axis of polarization at 45 degrees to the horizontal. The directional gyroscope 213 has mounted thereon a transparent cylinder 218 which has a polarized image of a landscape, seascape, or the like, together with a polarized image of a compass card 228, the axis of polarization of the images being parallel to that of the window where it is adjacent the window, and at right angles thereto when remote from the window. As described in our application Serial No. 556,244, caging and orienting of the directional gyro 213 is by means of knob 214, the compass card being read against the lubber-line 292.

In the rear part of the housing is mounted the attitude instrument, generally designated by the reference number 231. A support 235 has vertical sliding movement in a ways formed by mating dovetails 255 in the support 235 and a fixed support 243. The support 235 is adjusted vertically with relation to the support 243 and the housing 211 by means of a worm on the upper end of a vertical rotary shaft 266, the worm engaging mating threads in the support 235. The shaft 266 is rotated to raise or lower the support 235 by the bevel gears 261 and 262, and the shaft 268, which has a knob 269 on its outer end where it protrudes through the front of the casing.

The support 235 is semicircular with the ways 255 at its mid-length. The outer ends of the support have bearings 233 and 234, which support a gimbal ring 230 for free rotation about a horizontal axis transverse to the housing 211. An artificial-horizon type gyroscope and housing 232 is supported within and by the gimbal ring 230 for free rotation about a longitudinal axis. The air supply for the gyroscope in the housing is via the screened air-inlet 229, then through passageways in supports 243 and 235, via the bearing 233, gimbal ring 230 and through the right bearing of the gyro housing as viewed in Fig. 1. Air is exhausted from the gyro housing via the ports 237, the areas of which are controlled by the pendulous erection-vanes 236 in the conventional manner.

A bevel gear 248 is fixed to the gyro housing 232 and rotates with the housing about its pivots in the gimbal ring 230. A bevel gear 249 is carried by the gimbal ring 230 and is rotatable about the same axis as the gyro housing. A pair of bevel idler gears 250 and 251 are mounted on a shaft 252 on the gimbal ring 230 in such position that they engage both gears 248 and 249. By means of this construction, as the gyro housing tilts or rotates in one direction with respect to the gimbal ring 230, the gear 249 is rotated through an equal angle in the other direction.

A screen is comprised of two substantially cup-shaped elements 256 and 257 attached by their bottoms to the ends of the support 235. The edges of their open ends face each other and are slightly spaced, as shown in Fig. 1, to provide an annular groove therebetween. As shown in Fig. 2, the walls of the cup-shaped elements are cut away at the part where they face the rear of the housing to permit the arms of support 235 to pass into their interior.

An arm 258 fixed to the gear 249 passes through the annular groove and carries the silhouette 247 of an airplane at its end. The end of the arm is coaxial with the axis of rotation of the gyro housing within the gimbal ring 230 so that, as the gyro housing tilts or rotates in one direction with respect to the gimbal ring 230, the silhouette 247 is tilted through an equal angle in the other direction. It should be noted that there are not any stops to prevent the gyro housing from rotating through 360 degrees within the support 235. In order to obscure or render less noticeable the slot between the facing edges of the cup-shaped elements 256 and 257, a dish-shaped shield 259 having a central hole is carried by the gear 249 behind the slot and inside the cups 256 and 257. The shield 259 rotates with and is carried around with the gear 249 and the silhouette 247, and being painted the same color as the outside of the cups 256 and 257 will be visible underneath the slot and make the slot less noticeable.

A pair of vertically extending lights or banks of lights 283 and 284 are mounted one on each side of the housing interior and between the cup-shaped elements 256 and 257 and the cylinder 218 bearing the image of the seascape, etc. The said image has a definite horizon line 245 between the sea and the sky, and in using the instrument the pilot knows the position of his aircraft with respect to the natural horizon, and its heading, by noting the position of the silhouette 247 with respect to the horizon line 245 and the compass card 228 on the cylinder 218.

Up to this point the instrument described is the same as shown in Figures 10 and 11 of our patent application Serial No. 556,244.

It will be noted that if the pilot should make a half-loop and then a half-roll, the silhouette 247 would be out of sight towards the rear of the housing, even though the aircraft would be back in normal flight attitude. For this reason the additional silhouette 271 has been added.

The additional silhouette 271 is the same as the silhouette 247 except that it is spaced 180 degrees therefrom, rotating about the same axis as silhouette 247. The silhouette 271 is attached to a bevel gear 272 by means of a shaft 270, the gear 272 being mounted for rotation about the same axis as the gyro housing 232. A similar bevel gear 273 is attached to the gyro housing for rotation therewith about its pivots in the gimbal ring 230. Idler bevel gears 274 and 275, mounted for rotation about a vertical shaft 276 carried by the gimbal ring, engage the gears 272 and 273 to rotate the silhouette 271 when the gyro housing 232 tilts within the gimbal ring.

It will be apparent then, that if the pilot should maneuver his aircraft through a half-loop, the silhouette 247 will be completely out of sight, but its place will be taken by silhouette 271. Furthermore, the silhouette 271 will appear upside down, showing the pilot that he is in inverted flight. After making a half roll, the silhouette 271 will indicate normal flight. Without the added silhouette 271 provided by this invention, the pilot would not have any attitude indicating means after making the above maneuvers.

Figure 3:
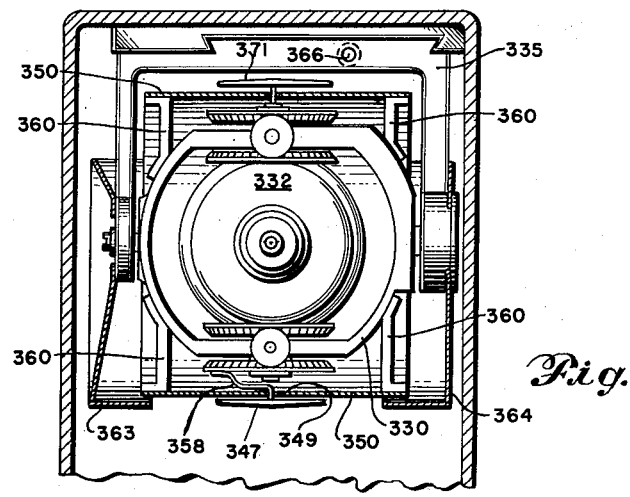
Fig. 3 is a plan view, partly in section, of another embodiment of the attitude-gyro part of the instrument.
Figure 4:
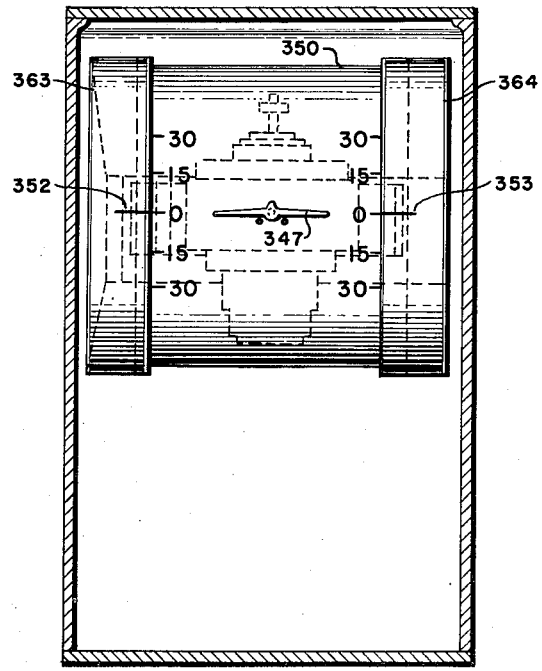
Fig. 4 is a front elevation of the attitude-gyro embodiment shown in Fig. 3.

The embodiment of Figs. 3 and 4 differs from the embodiment of Figures 1 and 2 in that the screen 350 is a continuous cylinder secured fixedly to the gimbal ring 330 by means of supports 360, and thereby rotatable together with the gimbal ring 330. A hole 349 is provided in the front of the screen 350 for the passage of the arm 358 which has the silhouette 347 attached to its end. At a diametrically opposite point a hole for the shaft upon which a similar silhouette 371 is mounted, is provided. As shown in Fig. 3, the shape of the ring or support 335 is more rectangular than the ring or support 235 of Fig. 1, so as to make room for the continuous screen 350. In order to cover the ends of the screen 350, a pair of substantially cup-shaped elements 363 and 364 are fastened to the ends of the support 335 so that their cylindrical sides overlap the edges of the screen 350. As in the previous embodiment, the gyro housing 332 is free to rotate through 360 degrees within the gimbal ring 330, which also has a full 360 degree freedom of movement.

Both the embodiments of Figs. 1 and 2 and of Figs. 3 and 4 have graduations which are numbered to indicate the degree of climb or dive. In the embodiment of Figs. 3 and 4, there are index marks 352 and 353 on each of the cup-shaped elements, the index marks being on the same level as the silhouette 347 when the aircraft is in level flight. The screen cylinder 350 has numbered graduations as shown indicating zero angle or level flight, and other angles such as 15, 30, 60, etc. degrees of dive or climb. Thus as the silhouette 347 is above or below the horizon line on the transparent cylinder, the numbered graduations on the screen cylinder 350 can be read against the index marks 352 or 353 to obtain the exact angle of climb or dive. Also, by means of these graduations, that part of the instrument which indicates the attitude of the aircraft may be used alone without that part which indicates the heading. For this reason, our invention thereby provides an improved and simplified as well as non-tumbling gyroscopic aircraft attitude instrument, as well as combined attitude and directional instrument.

While shaft 366, which raises and lowers the attitude gyro of Figs. 3 and 4, is shown in Fig. 3, the other shafts and gears which rotate the shaft 366 are not shown since they are similar to those shown in Figs. 1 and 2.

The invention can be embodied in other specific forms without departing from the spirit or essential characteristics thereof. The present invention and embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

We claim:

1. In an aircraft flight instrument, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a cylindrical polarized transparent element rotatable about a vertical axis and having a pictorial representation of a view from an aircraft, means for rotating said cylinder with respect to said silhouette, and polarized means to conceal a selected portion of said cylinder and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

2. In an aircraft flight instrument, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a polarized transparent element rotatable about a vertical axis and having a pictorial representation of a view from an aircraft, means for rotating said element with respect to said silhouette, and polarized means to conceal a selected portion of said cylinder, and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

3. In an aircraft flight instrument, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a transparent polarized element rotatable about a vertical axis and having a polarized pictorial representation of a view from an aircraft and means for rotating said element with respect to said silhouette, and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

4. In an aircraft flight instrument, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a polarized transparent element rotatable about a vertical axis and having a pictorial representation of a view from an aircraft and a compass card, and polarized means to conceal a selected portion of said element, means for rotating said element with respect to said silhouette, and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

5. In an aircraft flight instrument, a housing, a polarized viewing window in said housing, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a transparent polarized element having an axis of polarization parallel to the axis of polarization of said viewing window where adjacent to said window, and normal to the axis of polarization of said viewing window where remote therefrom, rotatable about a vertical axis and having a pictorial representation of a view from an aircraft and means for rotating said element with respect to said silhouette, and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

6. In an aircraft flight instrument, a gyroscope operable to spin about a normally vertical axis, a gimbal ring, a housing for said gyroscope mounted in front and rear bearings in said gimbal ring for rotation about a longitudinal axis, means defining a first airplane silhouette mounted for rotation on said gimbal ring about the same longitudinal axis as said gyroscope housing on the outside of said gimbal ring adjacent said front bearing, means defining a horizon line adjacent said first silhouette and comprising a transparent, polarized rotatable element having a pictorial representation of a view from an aircraft, means for rotating said element with respect to said silhouette, polarized means to conceal a selected portion of said element, and means defining a second silhouette mounted similarly to said first silhouette but adjacent said rear bearing, means supporting said gimbal ring for rotation about a transverse axis, and means connecting said silhouettes to said gyroscope whereby each silhouette will be rotated about the longitudinal axis but in the opposite direction from the direction of rotation of said gyroscope housing during movements of the aircraft about a longitudinal axis.

GEORGE W. HOOVER.
ERVING E. EASTON.

REFERENCES CITED

The following references are of record in the file of this patent:

UNITED STATES PATENTS

| Number | Name | Date |
|---|---|---|
| 1,939,825 | Narvesen et al. | Dec. 19, 1933 |
| 2,053,183 | Crane et al. | Sept. 1, 1936 |
| 2,086,897 | Carter et al. | July 13, 1937 |

FOREIGN PATENTS

| Number | Country | Date |
|---|---|---|
| 651,601 | Germany | Oct. 18, 1937 |